(12) United States Patent
White et al.

(10) Patent No.: US 6,379,603 B1
(45) Date of Patent: Apr. 30, 2002

(54) LATTICE GATE FOR INJECTION MOLDING OF RUBBER COMPOUNDS

(75) Inventors: John Richard White, Wadsworth; Robert Henry Vogliano, Tallmadge, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/445,522

(22) PCT Filed: Jun. 9, 1997

(86) PCT No.: PCT/US97/09916

§ 371 Date: Dec. 7, 1999

§ 102(e) Date: Dec. 7, 1999

(87) PCT Pub. No.: WO98/56559

PCT Pub. Date: Dec. 17, 1998

(51) Int. Cl.[7] .......................... B29C 45/00; B29C 45/27
(52) U.S. Cl. ....................... 264/328.2; 264/328.12; 425/543; 425/573
(58) Field of Search .................. 264/328.2, 328.12; 425/543, 573

(56) References Cited

U.S. PATENT DOCUMENTS

| | | |
|---|---|---|
| 2,426,651 A | 9/1947 | Stacy |
| 2,582,260 A | 1/1952 | Kutik |
| 3,989,434 A | 11/1976 | Mercer |
| 3,989,793 A | 11/1976 | Hertel et al. |
| 4,097,928 A | 6/1978 | Fries |
| 4,199,315 A | 4/1980 | Gallizia et al. |
| 4,536,362 A | 8/1985 | Donaldson |
| 4,717,521 A | 1/1988 | Border et al. |
| 4,980,111 A | 12/1990 | Majerus |
| 4,990,293 A | 2/1991 | Macosko et al. |
| 5,017,127 A | 5/1991 | Majerus et al. |
| 5,062,783 A | 11/1991 | Majerus et al. |
| 5,141,696 A | 8/1992 | Osuna-Diaz |

FOREIGN PATENT DOCUMENTS

| | | |
|---|---|---|
| GB | 1570853 | 1/1977 |

*Primary Examiner*—Leo B. Tentoni
(74) *Attorney, Agent, or Firm*—Howard M. Cohn (57) ABSTRACT

The present invention relates to a lattice gate for directing streams of rubber into an injection molding device through a plurality of intersecting channels (78, 80) which thermally mix the streams of rubber within the gate (76) as they pass through the intersections of the flow channels permitting the injection time of the rubber into the mold cavity to be decreased while simultaneously reducing the time for curing the rubber within the mold.

19 Claims, 6 Drawing Sheets

LATTICE GATE FOR INJECTION MOLDING OF RUBBER COMPOUNDS

TECHNICAL FIELD

The present invention relates to an improved gate design for injection molding of rubber compounds. More particularly, the present invention relates to an improved gate design for injection molding of rubber compounds with increased gate heating efficiency and reduced cycle time for curing the rubber part being injection molded.

BACKGROUND OF THE INVENTION

In a typical rubber injection molding process, the uncured, viscous rubber compound is introduced into the elongated barrel of an injection molding machine at ambient temperatures. It is advanced through the barrel towards a mold connected to the downstream end of the barrel, usually by either a rotating screw conveyor or a reciprocating ram or piston disposed in the barrel. As the rubber compound advances, it is heated by heat conduction and mechanical shear heating in the barrel to reduce its viscosity and render it more flowable and amenable to subsequent injection into the mold. Typically, the less viscous the rubber compound, the more easily it flows through the runners and gates and the more easily it fills the mold cavity to produce a satisfactorily molded object.

Since curing of the rubber compound is a "time at temperature" phenomenon, the heating also serves to supply some of the "time at temperature" requirement in the barrel without prematurely curing or scorching the compound in the barrel. This increase in temperature also reduces the "time at temperature" required in the mold and consequently the vulcanization cycle time. As known in the art, most rubber compounds can be cured through either a shorter exposure to a higher temperature or a longer exposure to a lower temperature, and it is this phenomenon that is referred to herein by the term "time at temperature".

Cure time in ram injection rubber molding, for example, consists of three separate and distinct "time at temperature" periods. The first is the "time at temperature" during the compounding and storage of the material prior to introducing the rubber into the upstream end of the barrel of the injection molding apparatus and is referred to as the "process scorch time". The second "time at temperature" is the "residual scorch time" or the time permitted in the barrel of the injection molding apparatus before incipient cure occurs. The higher the "time at temperature" during the process scorch time, the shorter will be the "time at temperature" permitted for the residual scorch time in the barrel of the apparatus. The third "time at temperature" is the "vulcanization time" of the compound within the mold itself. The three periods of time together comprise the total cycle time and the nature and degree of the "time at temperature" of the first two periods have an effect upon the third period, i.e., the cure or vulcanization time. Thus, rubber compounds with the same formulation at higher temperatures will vulcanize more quickly than the same rubber compounds at lower temperatures. In most injection molding operations, a smaller portion of the "time at temperature" requirement is supplied in the barrel of the injection molding apparatus, i.e., the residual scorch time, and larger portion of the "time at temperature" requirement is supplied in the heated mold, i.e., the vulcanization time.

In addition to the cumulative effect of the above "time at temperature" periods, there is a critical temperature range for each rubber compound called the "critical residual scorch temperature range" at which the vulcanizing of rubber is initiated. These temperature ranges are known to or can be determined by those skilled in the art. For typical rubber compounds the critical scorch temperature range can be between about 240° F. (115° C.) and 320° F. (160° C.). Just above that temperature range the compound will begin to "scorch" or vulcanize prematurely in some period of time, which may be minutes or seconds. Below that temperature range, vulcanization may require hours.

In a typical rubber injection molding process, the objective is to heat the rubber compound to the maximum temperature, just below the critical scorch temperature range, which will produce the lowest viscosity of the compound at this limited temperature. The inability to supply more temperature or heat energy or "time at temperature" in the barrel so that vulcanization time in the mold can be reduced has been a continuous problem in prior art processes and apparatus. It is toward this problem that the present invention is generally directed.

The rubber compound is usually initially heated by externally heating the barrel of the apparatus electrically, with a steam jacket or from some other such external heat source and transferring the heat by conduction from the hot barrel wall into the mass of the rubber compound moving downstream through the barrel. Additional heat is supplied to the compound by frictional forces and by shearing of the rubber compound which occurs in the barrel and screw, the sprue, and the runners and gate of the mold. In many cases, this additional heat is an important factor upon which the vulcanization depends. Once the compound is in the mold cavity, additional heat is supplied to the compound and the compound is held in the mold for the required "time at temperature" to vulcanize and complete the cure.

Vulcanizing cycle time can be reduced if the compound can be rapidly and uniformly heated to a higher temperature and then quickly injected into the mold so that more of the "time at temperature" required to cure the rubber compound occurs when the compound enters the mold. However, the rubber compound cannot be exposed to high temperatures for even short periods of time in the barrel or undesirable curing or scorching would take place before the rubber compound enters the mold. One difficulty encountered in attempting to quickly and uniformly heat the rubber compound, while it is still in the barrel, stems from the poor thermal conductivity of the rubber compound. This makes it difficult to use external heat to quickly heat the rubber compound to a uniform temperature throughout. To rapidly obtain the desired temperature in the portions of the rubber compound distant from the heat source, e.g., the electricity or steam heated barrel wall, it is necessary for the heat source to have a temperature substantially above that desired in the rubber compound. This produces local hot spots in the rubber compound in proximity to the barrel wall which cause formation of an undesirable skin of scorched rubber compound or prematurely vulcanized rubber compound near the barrel wall. This can produce undesirable pieces of cured rubber compound in the material before it even reaches the mold for final curing of the rest of the product. These pieces of cured rubber compound can clog the sprue and mold runners and ruin the molded product. As a result, the temperature of the barrel wall is usually maintained sufficiently low to avoid such hot spots and is kept below the critical scorch temperature. Consequently, the compound temperature does not become excessively high so that only a relatively small portion of the "time at temperature" required to cure the rubber compound is provided in the barrel. Furthermore, the temperature of the compound varies throughout, with the compound more distant from the barrel wall cooler than that close to the wall. The result of these factors is that a longer vulcanization cycle is required once the rubber compound is injected into the mold in order to provide the "time at temperature" required to complete the cure of the entire mass of rubber material.

Various techniques have been proposed to more quickly and uniformly heat the compound entering the mold by, for example, heating the rubber compound to high temperatures in the barrel. The heating of the compound increases its temperature and reduces its viscosity to produce a heated, plasticized, more flowable material suitable for injection into the mold. However, since the temperature of the injected material is not uniform, and since the "time at temperature" in the barrel is well below that required to cure the compound, relatively long vulcanizing cycles in the mold are still required.

The gate design is another important variable in the process for minimizing mold cycle time while still producing high quality molded parts. The gate is typically designed to rapidly heat rubber from about 240° F. (115° C.) to about 320° F. (160° C.) through a combination of both shear and conduction heating. The shear heating is generated by the rubber compound in the gate being forced to flow into a smaller area than that of the barrel from which the rubber compound is directed into the gate and the conduction heating is from the heat being conducted back into the rubber compound in the gate.

Figure 1:
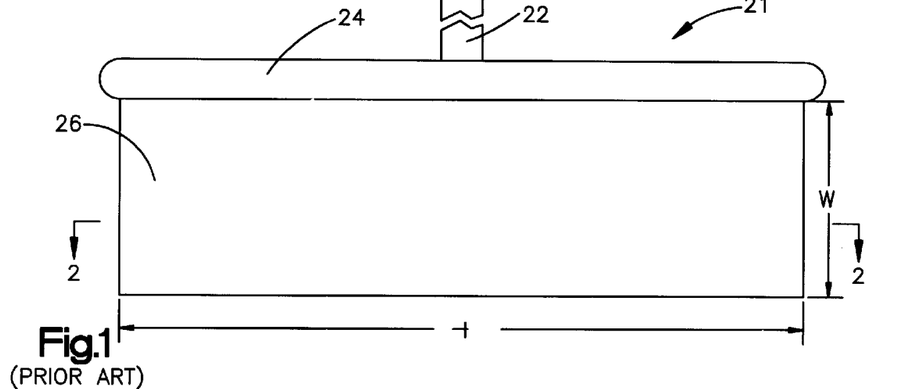
FIG. 1 is a plan view of rubber formed in a prior art flat gate.
Figure 2:
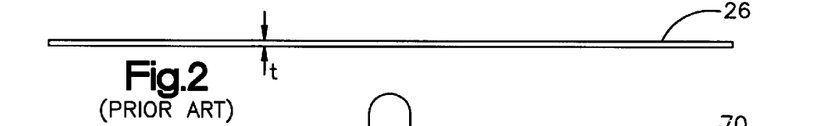
FIG. 2 is a view through line 2—2 of FIG. 1.

In an effort to reduce molding cycle times, faster injection rates are needed to minimize injection times. In some prior art molding applications, a continuous, thin flat cross-sectioned, film-type gate design is used, as shown in FIGS. 1 and 2. This type of gate design is good, but its rubber heating efficiency is reduced with increased injection speed because the shear heat generated by the faster injection speed is primarily absorbed in the gate wall or by the mold itself.

Based on experimental data, an excessive amount of heat is generated in the flat gate design by shear heating, which increases with injection speed. The heat from shear heating is usually generated within an outer 10% layer of the rubber flow thickness. Since rubber is a poor conductor of heat, this heat does not conduct quickly enough to evenly heat all of the rubber flowing through the gate. Instead, much of the shear heat from the rubber flowing through the gate is transferred into the wall of the metal gate itself or into the mold. Moreover, overheating of the gate can cause undesirable surface sink marks and rubber scorch.

There is a definite need to overcome the prior art problems which limit the decrease in the total cycle time for molding and vulcanizing parts of rubber in a mold.

OBJECTS AND SUMMARY OF THE INVENTION

It is an object of the present invention to provide an improved gate for directing rubber into an injection molding device being as defined in one or more of the appended claims and, as such, having the capability of being constructed to accomplish one or more of the following subsidiary objects.

It is an object of the present invention to provide an improved gate for directing rubber into a mold cavity of an is injection molding device and a method of thermally mixing streams of rubber flowing through the gate to reduce the temperature variation of the rubber flowing into the mold cavity.

It is a further object of the present invention to provide an improved lattice gate for directing streams of rubber into a mold cavity of an injection molding device wherein the cycle time is decreased as compared to a flat gate having a comparable flow rate.

It is still a further object of the present invention to provide an improved lattice gate for directing rubber into a mold cavity so that the minimum cure time is reduced.

In accordance with an embodiment of the invention, a lattice gate system for directing rubber into a mold cavity of an injection molding device includes a sprue for directing rubber into the gate; an elongated distribution channel connected to the sprue for receiving the rubber; and a plurality of separate, intersecting flow channels connected at one end to the elongated distribution channel and at the opposite end to the inlet of a mold for directing streams of rubber into the mold cavity.

Further, in accordance with the invention, the separate intersecting flow channels of the gate intersect at an angle of about 60° to about 140° and preferably about 90° to about 120° with respect to each other.

Also in accordance with the invention, the gate includes: a lattice gate sprue plate having a flat inner surface with an inlet end and an outlet end, and a plurality of separate flow channels extending parallel to each other and disposed at an angle of about 30° to about 70° with respect to a centerline extending through the lattice gate sprue plate from the inlet end to the outlet end; a lattice gate plate having a flat inner surface with an inlet end and an outlet end, and a plurality of separate flow channels extending parallel to each other at an angle of about 30° to about 70° with respect to a centerline extending through the lattice gate plate from the inlet end to the outlet end; and the flat inner surface of the lattice gate sprue plate being abutted against the flat inner surface of the lattice gate plate. The separate flow channels in the lattice gate plate intersect the separate flow channels in the lattice gate sprue plate whereby the rubber streams flowing through the separate flow channels in the lattice gate plate and the lattice gate sprue plate mix both physically and thermally and generate more shear heating at the intersections of the separate flow channels.

Moreover, in accordance with the invention, the lattice gate sprue plate has a sprue inlet bore extending through the lattice gate plate near the inlet end; and the lattice gate plate has a sprue inlet counterbore extending into the lattice gate plate near the inlet end and an elongated distribution channel extending across the lattice gate plate and connected to the sprue inlet counterbore and to the plurality of separate flow channels extending through the lattice gate plate and the lattice gate sprue plate from the elongated distribution channel to the outlet ends.

In accordance with an embodiment of the invention, there is provided a process for injecting a stream of rubber into an injection molding device comprising the steps of: directing the stream of rubber from the sprue channel into an elongated distribution channel; directing the a stream of rubber from the elongated distribution channel into a plurality of separate, intersecting flow channels connected at one end to the elongated distribution channel; thermally mixing rubber flowing through the separate flow channels at the intersection of the separate flow channels; and directing the rubber exiting the intersecting flow channels into a mold.

Further in accordance with the invention, the process includes the step of directing the rubber into a plurality of separate, intersecting flow channels wherein the separate intersecting flow channels intersect so that the flat surface of the flow channels contact each other.

In accordance with a second embodiment of the invention, the lattice gate can have a ring design to inject rubber into a circular, annulus-shaped mold having intersecting flow channels.

DETAILED DESCRIPTION OF THE INVENTION

Figure 13:
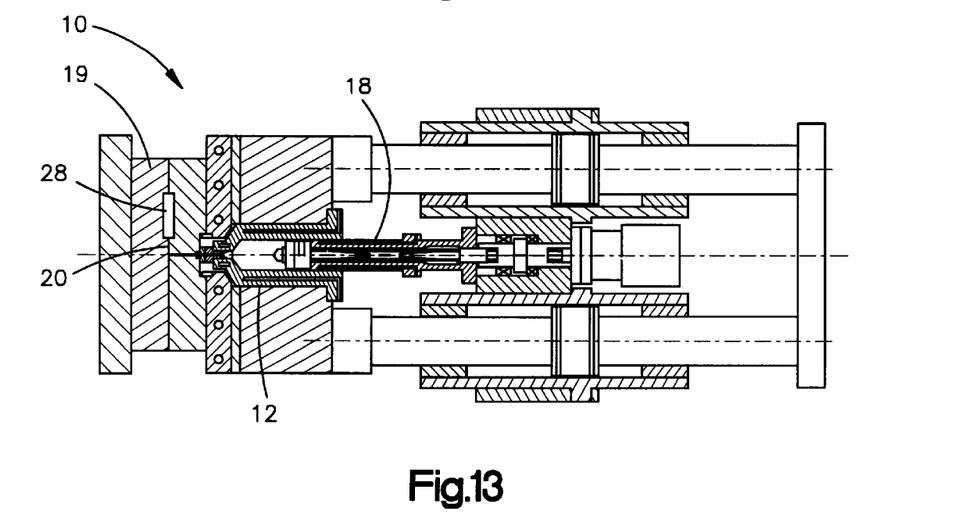
FIG. 13 is a schematic illustration of an injection molding device incorporating the lattice gate of the present invention.

Referring to FIG. 13, there is shown a schematic illustration of a typical injection molding machine 10 in accordance with the invention. The injection molding machine 10 includes an elongated barrel 12 into which rubber or a rubber compound is introduced. The rubber is driven through the barrel 12 by a rotating screw conveyor or a reciprocating ram or piston 18 disposed in the barrel 12, as is conventionally done in the prior art injection molding machines. The rubber moves through a gate system 20 to form a corresponding gate shaped portion of rubber. For example, as seen in FIGS. 1 and 2, there is illustrated a gate shaped portion of rubber 21 corresponding to the shape of a conventional flat gate system. The rubber exiting the gate system 20 then flows into the mold cavity 28 of a mold 19.

The present invention is primarily related to the design of a lattice gate system 30 for increasing the rubber to rubber contact through the gate system resulting in improved mixing and temperature uniformity of the rubber in the gate section, as compared to the prior art flat gate section 21. For purposes of the present invention, a 275-ton injection molding machine from Engel Corporation of Austria is suitable for use in the present invention.

In the past, a continuous flat gate shaped portion 21 of rubber, as illustrated in FIGS. 1 and 2 and which corresponds to the internal flow passage through a prior art flat gate system (not shown), includes a sprue 22, a distribution runner 24 and a flat gate section 26. In an exemplary flat gate shaped portion 21, the flat gate section has a thickness 't' of about 0.012, a width 'w' of about 5.0 inches and a length 'l' of about 1.25 inches.

Figure 14:
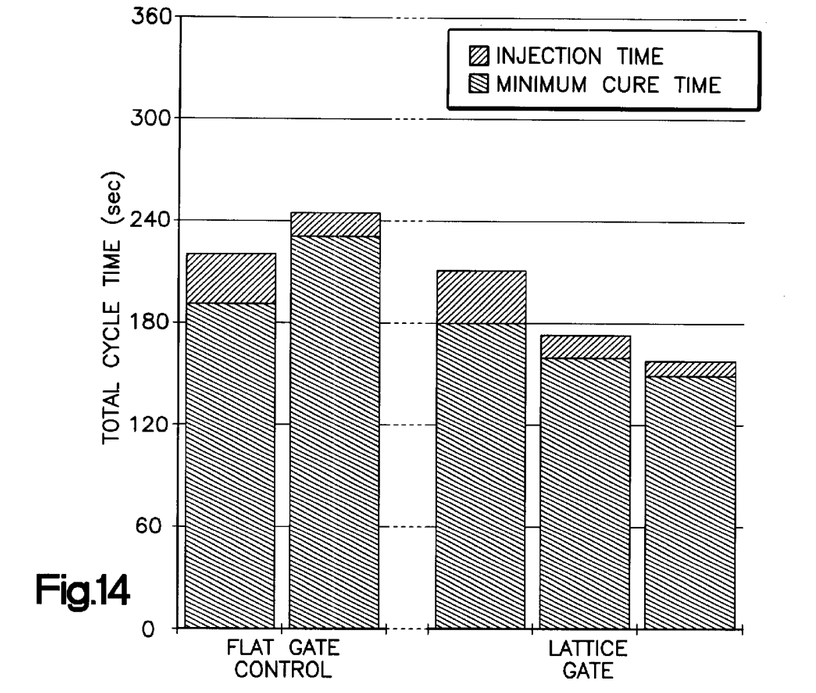
FIG. 14 is a chart illustrating the change in cycle time for flat and lattice type gates at increased injection speeds.
Figure 15:
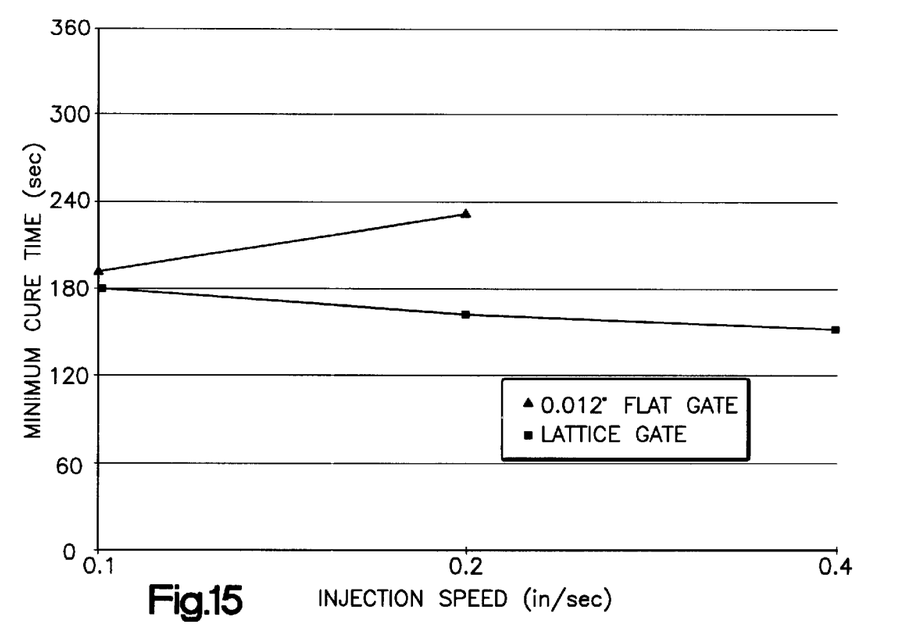
FIG. 15 is a graph illustrating the change in cure time for flat and lattice type gates at increasing injection speeds.
Figure 16:
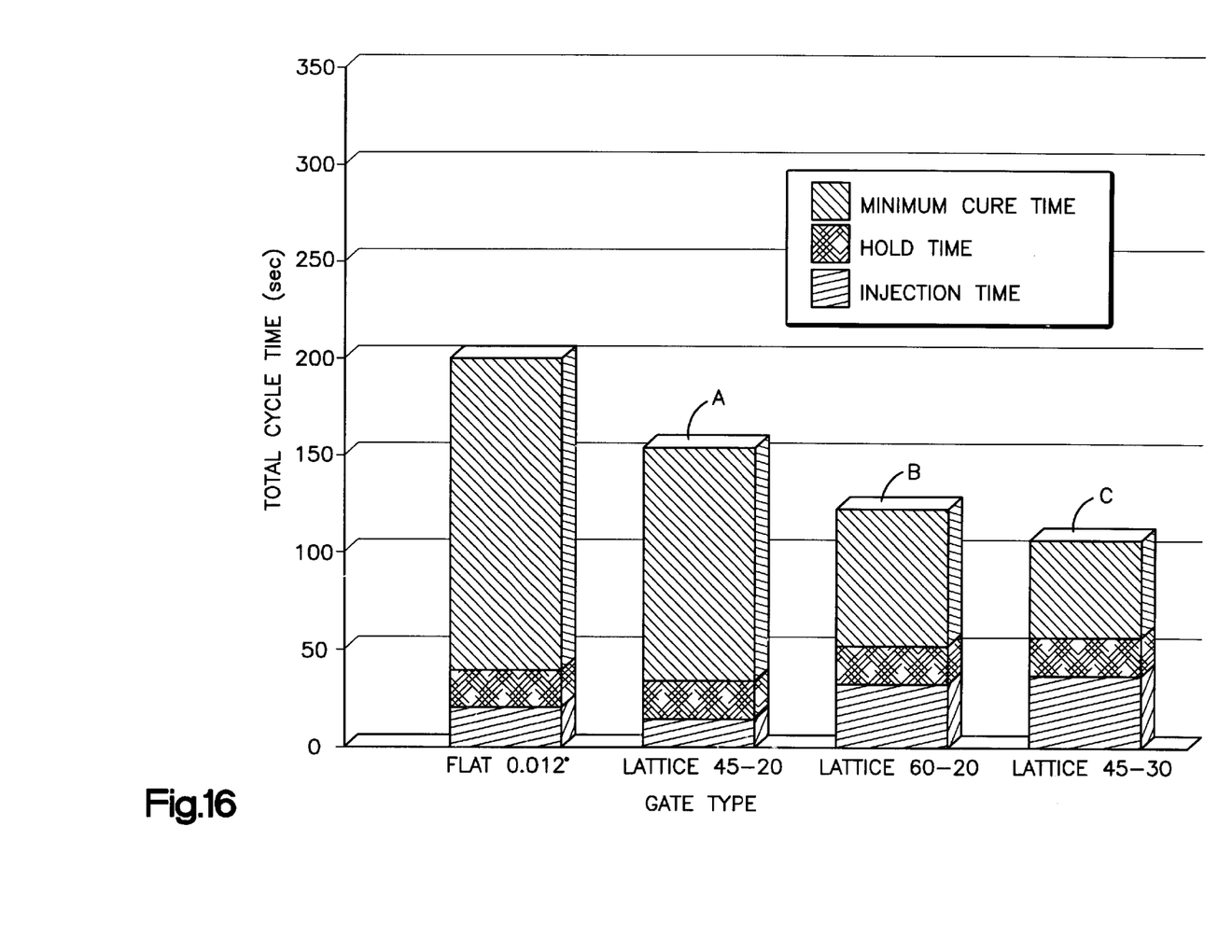
FIG. 16 is a chart illustrating total cycle time comparisons for different sized flat and lattice type gates.

With a continuous flat gate shaped portion 21 of rubber, as shown in FIGS. 1 and 2, there is an optimum gate injection velocity to obtain maximum heating efficiency from both conduction and shear heating. For the flat gate shape design, the heating efficiency drops as the injection speed increases, implying that heat conduction generates a significant portion of rubber heating because there is not enough time to evenly heat the rubber flowing through the gate. Generally though, faster injection speeds in flat gate designs can cause longer part cure times, as shown in FIGS. 14, 15 and 16, which can be attributed to lower rubber temperatures as measured directly after injection.

Figure 12:
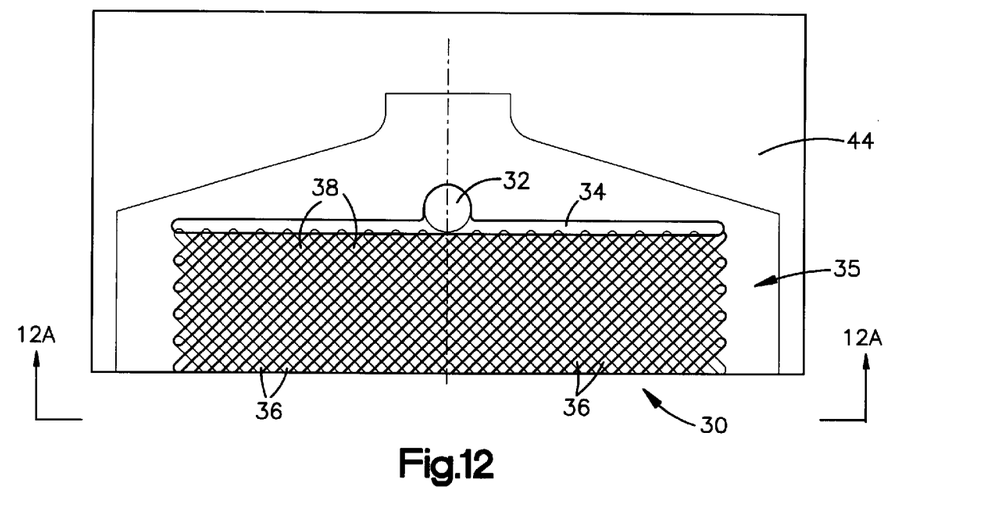
FIG. 12 is a schematic illustration showing the lattice gate of the present invention.

An improved lattice gate system 30, as generally illustrated in FIG. 12, incorporates a sprue channel 32, a distribution channel 34 and a lattice shaped gate section 35 of intersecting rubber flow channels 36 and 38 which force the rubber flowing through the lattice gate system to be continuously mixed at the intersections of the flow channels for improved thermal distribution. In effect, the lattice gate system 30 uses a multiplicity of "static mixers", i.e., at each intersection of the two rubber flow channels 36 and 38, in a continuous array to thermally mix the rubber in the lattice shaped gate section 35 just prior to entering the mold cavity 28 of the injection molding machine. As discussed before, the lattice gate system 30 is used to direct the rubber flow from the downstream end 16 of a barrel 12 of an injection molding machine into the mold cavity 28. In accordance with the present invention, the lattice gate system 30 is located in the mold. However, it is within the terms of the invention to locate the lattice gate system 30 outside of the mold.

Figure 6:
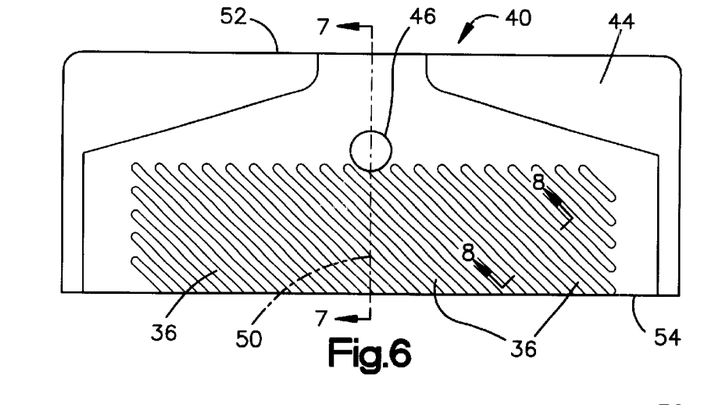
FIG. 6 is a plan view of a lattice gate sprue plate having a plurality of parallel flow channels disposed at an angle of 45° to the centerline through the plate.
Figure 7:
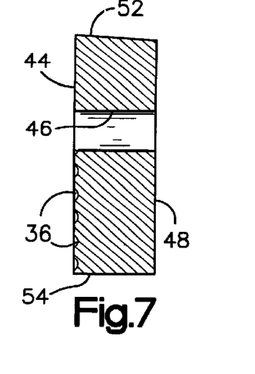
FIG. 7 is a view through line 7—7 of FIG. 6 showing the sprue passage.
Figures 8, 9, 10, 11:
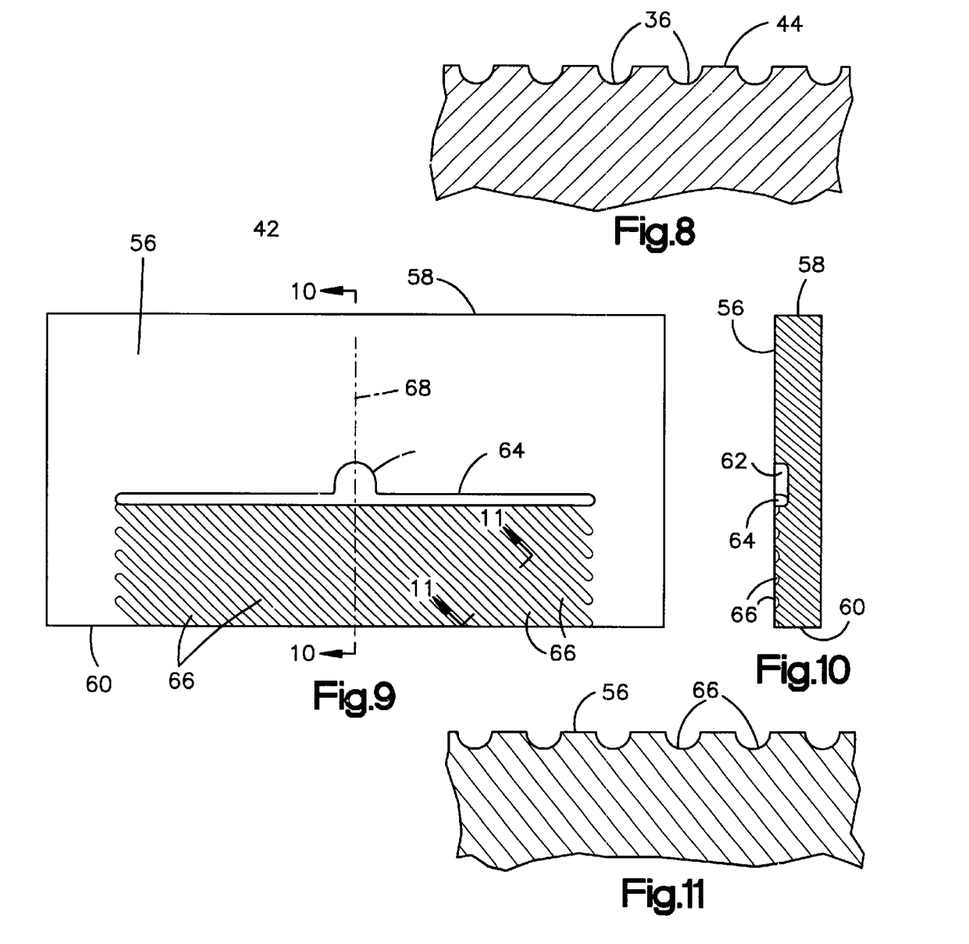
FIG. 8 is a view through line 8—8 of FIG. 7 showing the cross-sectional shape of the flow channels.
FIG. 9 is a plan view of a lattice gate plate having a plurality of parallel flow channels disposed at an angle of 45° to the centerline through the plate.
FIG. 10 is a view through line 10—10 of FIG. 9 showing the sprue groove connected to the elongated distribution channel.
FIG. 11 is a view through line 11—11 of FIG. 9 showing the cross-sectional shape of the flow channels.

Referring to FIGS. 6–11, there is illustrated the components of the lattice gate system 30, i.e., the lattice gate sprue plate 40 and the lattice gate plate 42. Referring to FIG. 6, there is illustrated a plan view of the inner surface 44 of lattice gate sprue plate 40. As shown in FIGS. 6 and 7, the sprue plate 40 includes a sprue bore 46 which extends from the outer surface 48 to the inner surface 44. A plurality of flow channels 36 which are formed into the inner surface of plate 40, as shown in FIGS. 6, 7 and 8, are parallel to each other and are disposed at an angle of about 30° to about 70°, and preferably at an angle of about 45° to about 60° with respect to a centerline 50 extending from the inlet end 52 to the outlet end 54 of the lattice gate sprue plate 40. As discussed in more detail below, as the angle of the parallel flow channel 36 with respect to the centerline increases, the time required for the rubber to transverse the distance between the inlet and outlet sides 52 and 54, respectively, of the lattice gate sprue plate 40 also increases and vice versa. As shown in FIG. 8, the flow channels 36 are illustrated with a semi-circular cross-section. However, it is within the terms of the invention to form the flow channels 36 with other cross-sections such as for example, elliptical, triangular, or square as desired.

Referring now to FIG. 9, there is shown a plan view of the flat inner surface 56 of lattice gate plate 42 having an inlet end 58 and an outlet end 60. A sprue inlet counterbore 62 that extends into the inner surface 56 is positioned between the inlet end 58 and the outlet end 60 of the lattice gate plate 42. As illustrated in FIGS. 9 and 10, the sprue inlet counterbore 62 is in flow communication with an elongated distribution channel 64 extending partially across the length of lattice gate plate 42 and in parallel relation to the outlet end 60. A plurality of flow channels 66 which are formed into the inner surface of lattice gate plate 42, as shown in FIGS. 9, 10 and 11, are parallel to each other and are disposed at an angle of about 30° to about 70°, and preferably at an angle of about 45° to about 60° with respect to a centerline 68 extending from the inlet end 58 to the outlet end 60 of the lattice gate plate 42. As discussed in more detail below, as the angle of the parallel flow channel 66 with respect to the centerline increases, the time required for the rubber to transverse the distance between the inlet and outlet sides 58 and 60, respectively, of the lattice gate plate 42 also increases and vice versa. As shown in FIG. 11, the flow channels 66 are preferably formed with a semi-circular cross-section. However, it is within the terms of the invention to form the flow channels 66 with any desired cross-sections such as for example, rectangular, triangular, or elliptical, as desired. Referring again to FIGS. 12 and 12A, there is shown the lattice gate system 30 with the flat inner surface 44 of the lattice gate sprue plate 40 abutted against the flat inner surface 56 of lattice gate plate 42 and secured thereto by conventional means such as bolting one to the other. After the lattice gate sprue plate 40 and the lattice gate plate 42 are secured to each other, the sprue bore 46 and the sprue inlet counterbore 62 intersect to form sprue channel 32. Also, the flat inner surface 44 of sprue plate 40 abuts against elongated distribution channel 64 to form distribution channel 34. As seen in FIG. 12, the distribution channel 34 is in fluid communication with the flow channels 36 and 38 that intersect to form the lattice shaped gate section 35.

Figure 12A:
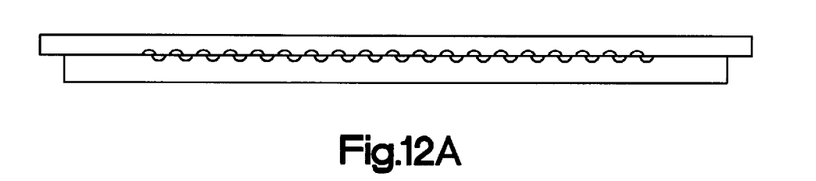
FIG. 12A is a view through line 12A—12A of FIG. 12.

An important aspect of the invention relates to the configuration of the distribution channel 34 after the lattice gate system 30 is assembled. That is, the flow channels 36 and 38 are disposed to intersect each other at an angle of about 60° to about 140° with respect to each other and preferably about 90° to about 120° with respect to each other. Also, portions of the flow channels 36 and 38 of the lattice gate sprue plate 40 and the lattice gate plate 42, respectively, are partially formed, typically with a half circle or elliptical shape, resulting from being abutted against the flat surface of the opposing, either the lattice gate plate 42 or the lattice gate sprue plate 40. The remaining portions of the flow channels 36 and 38 are formed at the intersection of the flow channels 36 and 38 and are illustrated in FIG. 12A as having an elliptical shape.

Certain of the advantages of the present invention can be appreciated by considering the process of injecting rubber into an injection molding machine incorporating a lattice gate system 30. The process includes the steps of directing rubber or a rubber compound into the inlet 14 of barrel 12 of the injection molding machine 10. The rubber is forced down the barrel 12 by conventional means, such as with a ram or screw injector device 18, as is conventionally known in the art. Next, the rubber is directed through a sprue channel 32 formed in the lattice shaped gate section 35 and then into the elongated distribution channel 34. Next, the rubber is directed from the elongated distribution channel 34 into the plurality of separate, intersecting flow channels 36 and 38 connected at the upstream ends to the elongated distribution channel 34 and at the opposite downstream ends to the mold cavity 28 of the injection molding machine 10.

Figure 3:
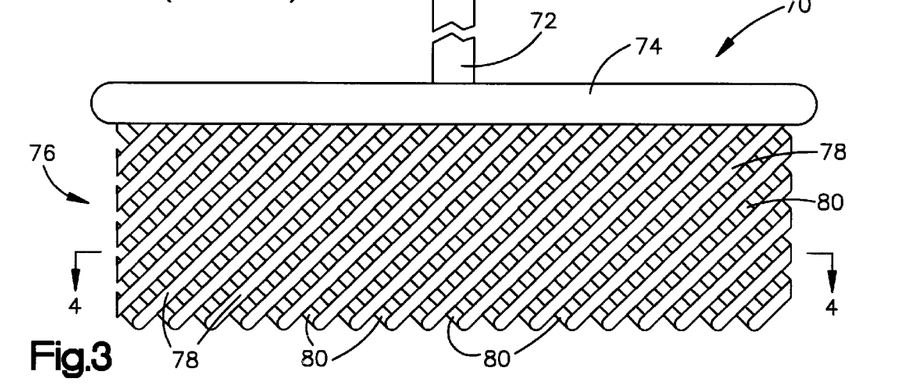
FIG. 3 is a plan view of rubber formed in a lattice gate in accordance with the present invention.
Figure 4:
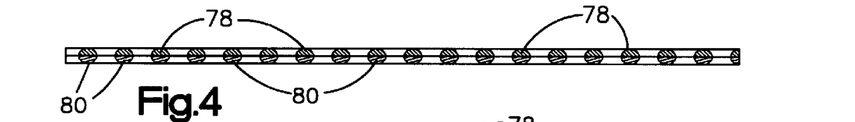
FIG. 4 is a view through line 4—4 of FIG. 3.
Figure 5:
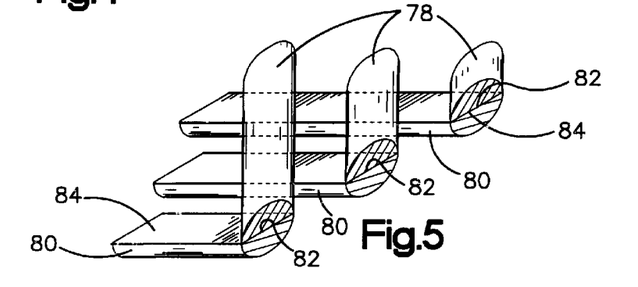
FIG. 5 is an exploded view of the three intersections of two flow channels each illustrating the flow of rubber through a lattice gate.

Referring to FIGS. 3, 4, and 5, the flow of the rubber through the lattice shaped gate section 35 forms the lattice gate shaped portion 70 of rubber which includes a sprue 72, a distribution runner 74 and a lattice gate section 76 of intersecting parallel rubber streams 78 and 80. As the streams 78 and 80 of rubber flow are forced through the separate intersecting flow channels 36 and 38, the rubber heats up and thermally mixes at each intersection of the separate flow channels, as illustrated in FIG. 5. Being that the separate intersecting rubber flow streams 78 and 80 each have a cross section disposed with the flat inner surfaces 82 and 84 abutting against each other at the plurality of intersections, the rubber flow streams form a differently shaped cross section, such as elliptical, at the intersection of the channels 36 and 38, as seen in FIG. 5. As the rubber streams continue their flow from one end of the gate to the other, they pass through a series of intersections where the rubber is thermally mixed. An important aspect of present invention is that while the number of intersections and the shape of the intersections can vary depending on the specific application, the rubber streams are thermally mixed more and to a higher temperature as the number of intersections through which the rubber streams flow increases.

The lattice gate shaped portion 70 of rubber, as shown in FIG. 3, effectively creates more physical mixing, rubber-to-rubber shear heating, and thermal mixing than in a comparable flat gate design, as shown in FIG. 1. For purposes of comparison, both the flat and lattice shaped gates have the same effective cross-sectional flow area. From the results discussed below, and illustrated in FIGS. 14, 15, and 16, the blow point cure time for the lattice gate design of FIG. 3 decreased with increasing injection speed, with no adverse affects on part scorch, whereas the comparable flat gate design of FIG. 1, when subjected to similar conditions, exhibited part scorch.

To one skilled in the art of molding rubber articles, it is known that porosity in the interior of rubber articles must be avoided. Porosity creates weak, spongy areas in the finished product which can be the locations at which the article blows or fails in service. The finished article also can have undesirable bulges from the porosity which cause parts to be scrapped. Blowing is caused when the internal pressure of volatiles in the rubber compound exceed the strength of the material at the time of demolding or removal from the mold. Porosity results when the rubber article is demolded prior to curing beyond the part's blow point. For one skilled in the art, the cure time is determined or limited by the point of least cure in an article. The article will "blow" or have porosity when the cure time is less than the "blow point" cure time.

Referring to FIGS. 14, 15, and 16, there is shown the results of increasing the injection speed through a flat gate design as compared with a comparable, or substantially equivalent lattice gate design having substantially the same effective cross-sectional flow area. Referring specifically to FIG. 14, there is illustrated a chart comparing the total cycle time, i.e., the injection time plus the cure time, in seconds between a prior art flat gate and comparable lattice gate design of the present invention. The chart of FIG. 14 indicates that as the injection time decreases for the flat gate, the minimum cure time increases. Conversely, when the injection time decreases for the lattice gate design, the cure time decreases. During the testing procedure, it was observed that for a given injection speed, the injection time through both the flat and lattice gates are the same, as would be expected since they have the same effective cross-sectional flow area. However, an unexpected result was that the difference in the total cycle time occurred based on differences in the minimum cure time. The results illustrated in FIG. 14 graphically show a very significant advantage of the lattice gate design. That is, a decrease in injection time for the lattice gate design results in a decrease in the minimum cure time, the largest portion of the total cycle time. The minimum cure time is defined as the least cure time which exceeds the blow point at the point of least cure in the article being molded.

FIG. 15 is a chart using the same data as FIG. 14 that also shows a decrease in the minimum cure time as time for specific injection speed increases with the lattice gate, as opposed to the flat gate which has a significantly higher minimum cure time blow point for the same injection speed. As shown in FIG. 15, the cure time for the flat gate design depends on the injection speed. That is, as the injection speed increases beyond 0.1 inches per second, the minimum cure time also increases. Conversely, with the lattice gate design, the injection speed is inversely proportional to the minimum cure time, i.e., as the injection speed increases, the minimum cure time decreases.

Referring to FIG. 16 there are illustrated bar graphs comparing the total cycle time, i.e., the injection time plus the hold time plus the minimum cure time for substantially equivalent flat and lattice gate designs having substantially the same effective cross-sectional flow area. The hold time is the time that the part is held at high pressure before the injector is retracted for the next screw and injection refill cycle.

Another observation based on the data shown in the bar graphs is that as the angle that the streams of rubber intersect each other increases, i.e. from an intersection angle of between about 90° and 120°, the resistance through the gate also increases along with the injection time. However, the increased resistance results in more thermal heating which causes the total cycle time to further decrease. In one test, the number of streams was increased from gate A of twenty (20) streams to gate C where there were thirty (30) streams. The result was again increased resistance through the gate which, while causing increased injection time, resulted in a reduced total cycle time.

Figures 17, 18:
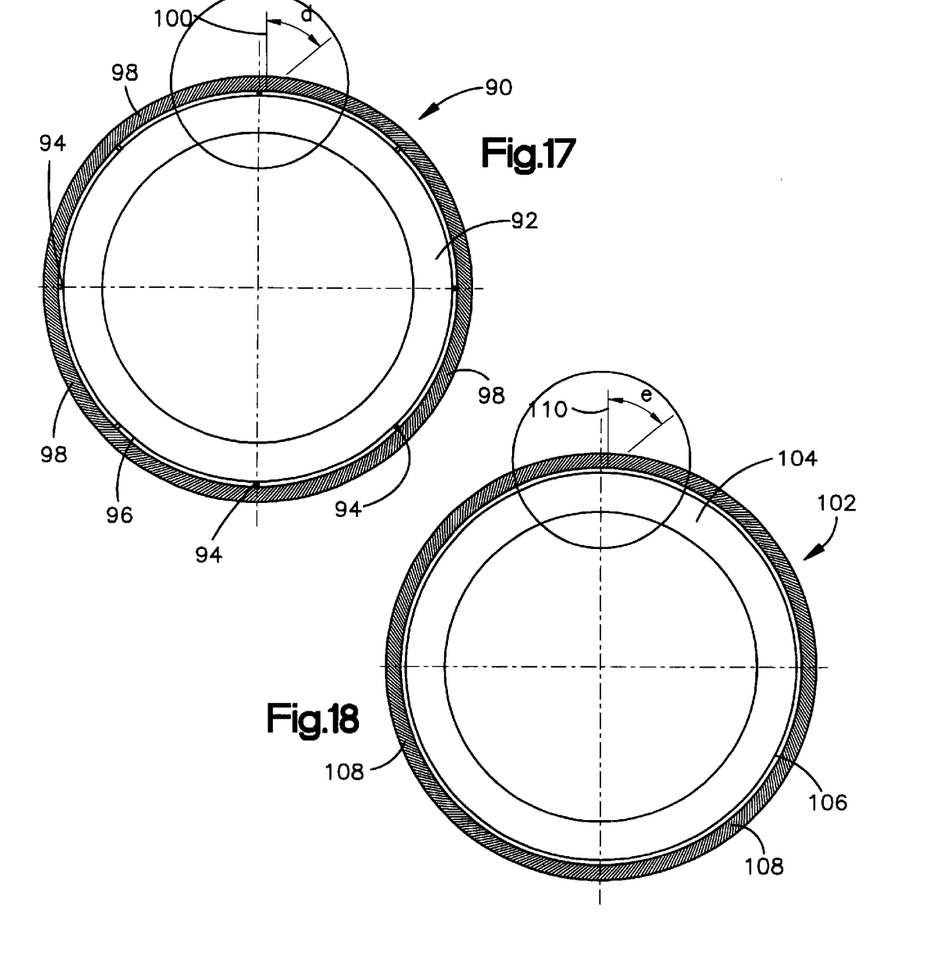
FIG. 17 is a plan view of a top plate of a lattice rage ring.
FIG. 18 is a plan view of a bottom plate of lattice gage ring.

In accordance with a second embodiment of the present invention, a lattice gate built along the concepts of the lattice gates described herein before, has a ring shape for injecting rubber into a circular, annulus-shaped mold (not shown). The top lattice gate ring 90, as illustrated in FIG. 17, has an interior surface 92 with a plurality of sprue holes 94 disposed around the circular distribution channel 96. The channel 96 is intersected by a plurality of flow channels 98 which extend around the peripheral edge of lattice gate ring 90. Each of the grooves which form flow channels 98 is disposed to intersect a centerline 100 at an angle "d" of about 30° to about 70° and preferably at an angle of about 45° to about 60°. The channels 98, as shown, have an angle "d" of about 45° and are at 1° spacing to provide 360 channels about the circumference of the ring 90. While 360 channels 98 are illustrated, it is within the terms of the invention to use any desired number of channels.

The bottom plate 102, as shown in FIG. 18, has an interior surface 104 with a circular distribution channel 106. A plurality of channels 108 extend around the outer circumference of the bottom lattice gate ring plate 102 at an angle "e" with respect to centerline 110 where "e" corresponds to the angle "d" in the top lattice gate ring plate 90 with the same angle as selected for the channels 98. As with the top lattice gate ring plate 90, the channels 108 are illustrated as being disposed 1° apart so that 360 channels 108 extend around the circumference of the bottom plate 102.

Figure 19:
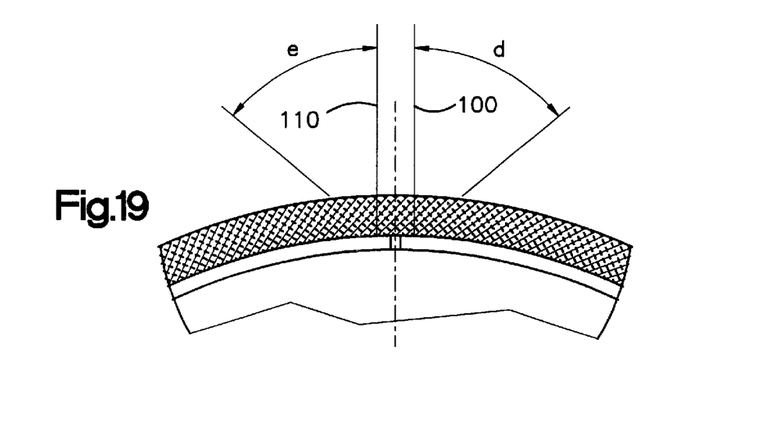
FIG. 19 is a schematic illustration of the lattice gate ring of the present invention.

FIG. 19 illustrates a section of a lattice gate ring 112 where the interior surface 92 of the top lattic gate ring plate is abutted against the interior surface 104 of the bottom lattice gate ring plate 102 so that channels 98 and 108 intersect each other. The stream of rubber is forced through the sprue bores 94 into the distribution channel formed between channels 96 and 106 and then into the intersecting channels 98 and 108 so that the rubber is continuously mixed at the intersections of the flow channels for improved thermal distribution as the rubber is directed into the mold cavity.

The second embodiment, as illustrated in FIG. 19, of the lattice gate ring 112 is basically operated with the same principles as the lattice gate system 30 described before and generally illustrated in FIG. 12.

It is apparent that there has been provided in accordance with this invention a lattice gate design and the method of using the lattice gate with an injection molding machine that satisfies the objects, means and advantages set forth hereinbefore. According to the invention, the improved lattice gate design directs rubber into an injection molding device whereby the rubber can be physically mixed within the gate to decrease the injection time while simultaneously reducing the curing time for a rubber part formed in a mold cavity supplied by the lattice gate.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A lattice gate for injection molding of rubber into a mold cavity of an injection molding device, the lattice gate characterized by:
    an elongated distribution channel for receiving a stream of the rubber;
    a first plurality of spaced flow channels connected at one end to the elongated distribution channel and at the opposite end to the mold cavity; and
    a second plurality of spaced flow channels connected at one end to the elongated distribution channel and at the opposite end to the mold cavity, the first and second plurality of spaced flow channels disposed to intersect each other causing the stream of rubber through each of the first and second plurality of spaced flow channels to mix thermally.

2. The lattice gate of claim 1 further characterized in that the first and second plurality of spaced flow channels have a shape selected from the group consisting of an elliptical, a semi-circular, a rectangular, and a triangular cross section.

3. The lattice gate of claim 2 further characterized in that the first and second plurality of spaced flow channels form at the intersection of the flow channels an elliptical cross section.

4. The lattice gate of claim 1 further characterized in that the first and second plurality of spaced flow channels intersect at an angle of about 60° to about 140° with respect to each other.

5. The lattice gate of claim 4 further characterized in that the first and second plurality of spaced flow channels intersect at an angle of about 90° to about 120° with respect to each other.

6. The lattice gate of claim 1 further characterized in that the first plurality of spaced flow channels are each disposed in parallel relation to each other, and the second plurality of spaced flow channels are each disposed in parallel relation to each other.

7. The lattice gate system of claim 1 further characterized by a sprue channel for directing rubber into the elongated distribution channel.

8. The lattice gate of claim 1 further characterized by:

a lattice gate sprue plate having a flat inner surface with an inlet end and an outlet end, and the first plurality of spaced flow channels extending parallel to each other and at an angle of about 30° to about 70° with respect to a centerline extending through the lattice gate sprue plate from the inlet end to the outlet end;

a lattice gate plate having a flat inner surface with an inlet end and an outlet end, and the second plurality of spaced flow channels extending parallel to each other at an angle of about 30° to about 70° with respect to a centerline extending through the lattice gate plate from the inlet end to the outlet end; and the flat inner surface of the lattice gate sprue plate abutting against the flat inner surface of the lattice gate plate so that the first plurality of spaced flow channels in the lattice gate sprue plate intersect the second plurality of spaced flow channels in the lattice gate plate.

9. The lattice gate of claim 8 further characterized in that the first plurality of spaced flow channels in the lattice gate sprue plate and the second plurality of spaced flow channels in the lattice gate plate form the same angle with respect to the centerline through the respective gate sprue plate and gate plate.

10. The gate of claim 9 further characterized by:

the lattice gate sprue plate having a sprue inlet bore extending through the lattice gate sprue plate near the inlet end; and the lattice gate plate having a sprue inlet counterbore extending into the lattice gate plate near the inlet end and an elongated distribution channel extending across the lattice gate plate and connected to the sprue inlet counterbore and to the plurality of separate flow channels, said flow channels extending through the lattice gate plate and the lattice gate sprue plate from the elongated distribution channel to the outlet ends of the respective gate plate and gate sprue plate.

11. A process for injection molding of rubber, characterized by the steps of:

directing a stream of rubber into an elongated distribution channel;

directing the stream of rubber from the elongated distribution channel into first and second pluralities of spaced, intersecting flow channels connected at one end to the elongated distribution channel;

thermally mixing the rubber stream flowing through the first and second spaced flow channels at the intersection of the first and second spaced flow channels; and directing the rubber exiting the first and second spaced flow channels into a mold cavity.

12. The process of claim 11 further characterized in that the step of directing the stream of rubber into the first and second pluralities of spaced, intersecting flow channels include the step of intersecting the streams of rubber flowing through the first and second pluralities of flow channels so that a flat surface of the streams of rubber flowing through the first pluralities of flow channels abut against the flat surface of the streams of rubber flowing through the second pluralities of flow channels.

13. The process of claim 12 further characterized by including the step of directing the streams of rubber into the pluralities of first and second spaced flow channels intersecting at an angle of about 60° to about 140° with respect to each other.

14. The process of claim 13 further characterized by including the step of directing the rubber into the pluralities of first and second spaced flow channels intersecting at an angle of about 80° to about 120° with respect to each other.

15. A lattice gate for injection molding of rubber into an annulus-shaped mold cavity of an injection molding device, the lattice gate characterized by:

a circular distribution channel for receiving a stream of the rubber;

a first plurality of spaced flow channels connected at one end to the circular distribution channel and at the opposite end to the annulus-shaped mold cavity; and a second plurality of spaced flow channels connected at one end to the circular distribution channel and at the opposite end to the annulus-shaped mold cavity, the first and second plurality of spaced flow channels disposed to intersect each other causing the stream of rubber through each of the first and second plurality of spaced flow channels to mix thermally.

16. The lattice gate of claim 15 further characterized in that the first and second plurality of spaced flow channels intersect at an angle of about 60° to about 140° with respect to each other.

17. A process for injection molding of rubber, characterized by comprising the steps of:

directing a stream of rubber into a circular distribution channel;

directing the stream of rubber from the circular distribution channel into first and second pluralities of spaced, intersecting flow channels connected at one end to the circular distribution channel;

thermally mixing the rubber stream flowing through the first and second spaced flow channels at the intersection of the first and second spaced flow channels; and directing the rubber exiting the first and second spaced flow channels into an annulus-shaped mold cavity.

18. The process of claim 17 further characterized in that the step of directing the stream of rubber into the first and second pluralities of spaced, intersecting flow channels include the step of intersection of the streams of rubber flowing through the first and second pluralities of flow channels so that a flat surface of the streams of rubber flowing through the first pluralities of flow channels abut against the flat surface of the streams of rubber flowing through the second pluralities of flow channels.

19. The process of claim 18 further characterized by including the step of directing the streams of rubber into the pluralities of first and second spaced flow channels intersecting at an angle of about 60° to about 140° with respect to each other.

* * * * *